(12) United States Patent
Rosales et al.

(10) Patent No.: US 9,938,754 B2
(45) Date of Patent: Apr. 10, 2018

(54) BOWDEN CABLE ARRANGEMENT

(71) Applicant: Brose Schliesssysteme GmbH & Co. KG, Wuppertal (DE)

(72) Inventors: David Rosales, Rochester Hills, MI (US); Michael Wittelsbuerger, Lake Orion, MI (US); Stepan Hanke, Lake Orion, MI (US)

(73) Assignee: Brose Schliesssysteme GmbH & Co. Kommanditgesellschaft, Wuppertal (DE)

( * ) Notice: Subject to any disclaimer, the term of this patent is extended or adjusted under 35 U.S.C. 154(b) by 0 days.

(21) Appl. No.: 14/871,612

(22) Filed: Sep. 30, 2015

(65) Prior Publication Data

US 2016/0123044 A1    May 5, 2016

Related U.S. Application Data

(60) Provisional application No. 62/058,091, filed on Sep. 30, 2014.

(51) Int. Cl.
| | |
|---|---|
| *F16C 1/22* | (2006.01) |
| *E05B 79/20* | (2014.01) |
| *E05B 53/00* | (2006.01) |
| *E05C 3/16* | (2006.01) |
| *E05C 3/22* | (2006.01) |

(52) U.S. Cl.
CPC ............ *E05B 79/20* (2013.01); *E05B 53/005* (2013.01); *E05C 3/16* (2013.01); *E05C 3/22* (2013.01); *F16C 1/223* (2013.01)

(58) Field of Classification Search
CPC .. F16C 1/22; F16C 1/223; F16C 1/226; F16C 1/10; E05B 79/20
See application file for complete search history.

(56) References Cited

U.S. PATENT DOCUMENTS

| 4,448,090 A * | 5/1984 | Carre ...................... F16C 1/226 192/111.12 |
|---|---|---|
| 9,382,734 B2 * | 7/2016 | Rosales ................... E05B 79/06 |
| 2007/0120382 A1 * | 5/2007 | Chevalier ............... E05B 77/06 292/336.3 |
| 2014/0251062 A1 * | 9/2014 | Snodgrass ............... F16C 1/226 74/502.4 |
| 2016/0097223 A1 * | 4/2016 | Rosales ................... E05B 77/12 292/92 |

FOREIGN PATENT DOCUMENTS

WO    2014019960    2/2014

\* cited by examiner

*Primary Examiner* — Vicky A Johnson
(74) *Attorney, Agent, or Firm* — Pauly, DeVries Smith & Deffner LLC

(57) ABSTRACT

A Bowden cable arrangement is provided for a motor vehicle door lock arrangement, wherein the Bowden cable arrangement has a cable strand and a cable conduit, and wherein an adjustment device is provided with a first coupling element and a second coupling element within the chain of operating forces of the cable strand and with a coupling mechanism. In some embodiments the coupling elements may be coupled to each other by the coupling mechanism in different coupling positions relative to each other in order to adjust the length of the cable strand.

16 Claims, 3 Drawing Sheets

BOWDEN CABLE ARRANGEMENT

PRIORITY CLAIM

This application claims the benefit of U.S. Provisional Application No. 62/058,091, filed Sep. 30, 2014, the content of which is herein incorporated by reference in its entirety.

FIELD OF THE TECHNOLOGY

This application is generally directed to motor vehicle door lock arrangements, and is more particularly directed to a Bowden cable arrangement for a motor vehicle door lock arrangement.

BACKGROUND

The Bowden cable arrangement is assigned to a motor vehicle door lock arrangement, which again comprises a motor vehicle door lock. A motor vehicle door lock in question is assigned to a motor vehicle door arrangement which comprises at least a motor vehicle door. The expression "motor vehicle door" is to be understood in a broad sense. It includes in particular side doors, back doors, lift gates, trunk lids or engine hoods. Such a motor vehicle door may generally be designed as a sliding door as well.

The Bowden cable arrangement in question may be used for various purposes. The known Bowden cable arrangement (WO 2014/019960 A2), which is the starting point of the invention, provides a mechanical connection between an outer door handle of the motor vehicle door lock arrangement and the motor vehicle door lock.

Due to cost efficient manufacturing, mechanical tolerances occur in the mechanical components that are to be connected by the Bowden cable arrangement. Therefore it is generally foreseen to "reserve" a certain free travel within the force transmission chain, which free travel guarantees that the tolerances do not negatively affect the function of the motor vehicle door lock arrangement. However, the above noted free travel is of no use other than for the compensation of those tolerances.

SUMMARY

One possible object of the invention is to provide a Bowden cable arrangement for a motor vehicle door lock arrangement, which removes or at least reduces the necessity of free travel due to mechanical tolerances with low costs and low packaging space requirements. This object is solved by a Bowden cable arrangement as described herein. For example, various embodiments are based on the idea to provide an adjustment device which allows adjusting the length of the cable strand of the Bowden cable arrangement.

In detail it is proposed to provide the adjustment device with a first coupling element and a second coupling element within the chain of operating forces of the cable strand and also with a coupling mechanism. The coupling elements may be coupled to each other by the coupling mechanism in different coupling positions relative to each other in order to adjust the length of the cable strand. In the present context, the expression "adjustment of the cable strand" is equivalent to the expression "adjustment of the length of the cable strand".

Here, the expression "cable strand" is to be understood in a broad sense. It includes the complete cable arrangement not only with the cable as such, but also with all coupling elements for coupling of the Bowden cable arrangement to the components to be connected with each other.

The possibility of adjusting the length of the cable strand allows to compensate tolerances that occur in the components to be connected by the Bowden cable arrangement. As it is only the cable, which length is being adjusted, the rest of the geometry of the Bowden cable arrangement remains unchanged during adjustment.

An easy to use arrangement may be achieved according to an embodiment, as the adjustment device may be used just like a ratchet assembly. As a result the adjustment may go back on an easy adjustment movement of the coupling element relative to each other, without the need of any tools for fixing the coupling elements to each other at the respective coupling position.

Various embodiments are directed to a structural design, which comprises a coupling spring for coupling engagement with the two coupling elements. Applying a coupling spring, which can be a wire spring, leads to an extremely cost effective approach, while allowing high operating forces to be transmitted via the adjustment device.

An embodiment proposes an easy to realize possibility to bring the two coupling elements out of coupling engagement in order to adjust the length of the cable strand. In particular, the proposed throw out contour of the second coupling element may be realized with low effort.

According to an embodiment, the first coupling element is of oblong design and comprises a plurality of driving contours and/or of blocking contours for the engagement with the coupling spring. It is advantageous here that the resolution regarding the adjustability mainly depends on the distance of the blocking contours to each other along the path of relative movement between the two coupling elements. The expression "resolution" means here the minimum possible distance between two adjacent relative coupling positions between the coupling elements. In other word, the expression "resolution" gives a value for the possible accuracy, the adjustment of the cable strand may be performed with.

An embodiment guarantees high flexibility during the installation of the Bowden cable arrangement and also the corresponding motor vehicle door lock arrangement as the two coupling elements may be rotated against each other with respect to the path of relative movement between those coupling elements such that mechanical stress, that may go back on rotating the two coupling elements against each other, does not occur.

Various embodiments are directed to a possibility to increase the resolution with regard to the adjustability by providing not only one engagement arrangement consisting of a blocking contour and a throw-out contour, but by providing at least two of such engagement arrangements, which are spaced from each other along the path of relative movement between the coupling elements. In an embodiment, the resolution may be increased remarkably compared to the situation with only one engagement arrangement.

A second embodiment is directed to a motor vehicle door lock arrangement with a motor vehicle door lock, wherein an above noted Bowden cable arrangement is provided. All explanations given for the first teaching are fully applicable to this second teaching.

An embodiment includes a Bowden cable arrangement for a motor vehicle door lock arrangement, wherein the Bowden cable arrangement comprises a cable strand and a cable conduit, wherein an adjustment device is provided with a first coupling element and a second coupling element within the chain of operating forces of the cable strand and with a coupling mechanism, which coupling elements may be coupled to each other by the coupling mechanism in different coupling positions relative to each other in order to adjust the length of the cable strand.

In an embodiment, the coupling mechanism is of the type of a ratchet assembly with respect to the coupling elements.

In an embodiment, the coupling mechanism may be brought into a coupling state, in which it couples the coupling elements with each other for the transmission of operating forces, and into a decoupling state, in which it decouples the coupling elements from each other.

In an embodiment, the coupling mechanism couples the coupling elements only in a first direction of force between the coupling elements and lets the coupling elements run free in a second direction of force between the coupling elements.

In an embodiment, the coupling mechanism comprises at least one coupling spring, which coupling spring engages the two coupling elements for coupling them in the different coupling positions relative to each other, such that the coupling spring is a wire spring, and/or that the coupling spring is a leg spring with a spring body and a first leg and a second leg.

In an embodiment, the coupling state, the coupling spring is in an engagement position and therewith in form fit engagement with both coupling elements and that in the decoupling state, the coupling spring is in a disengagement position and therewith out of form fit engagement from at least one of the coupling elements.

In an embodiment, when driving the two coupling elements into the first direction of force the coupling spring is in engagement with a blocking contour of the first coupling element and a blocking contour of the second coupling element, blocking a relative movement between the coupling elements.

In an embodiment, when driving the two coupling elements into the second direction of force the coupling spring is driven by a driving contour of the first coupling element to come into engagement with a throw out contour of the second coupling element, which throw out contour forces the coupling spring into the disengagement position, such that a reset actuation on the coupling spring drives the coupling spring to come into engagement with the throw out contour of the second coupling element, which throw out contour forces the coupling spring into the disengagement position.

In an embodiment, the first coupling element is of oblong design and comprises a plurality of driving contours and/or of blocking contours, which may come into engagement with the coupling spring depending from the coupling position of the coupling elements relative to each other, such as the first coupling element comprises a plurality of ring like grooves along its longitudinal extension, each groove being defined by a blocking contour and a driving contour, that the driving contours and/or the blocking contours is/are aligned perpendicularly to the longitudinal extension of the first coupling element.

In an embodiment, the first coupling element and/or the second coupling element is/are rotationally symmetric with respect to the path of relative movement between the coupling elements.

In an embodiment, the second coupling element comprises at least a first engagement arrangement with a first blocking contour and a first throw out contour and a second engagement arrangement with a second blocking contour and a second throw out contour, which engagement arrangements are spaced from each other along the path of relative movement between the coupling elements.

In an embodiment, the spacing between the engagement arrangements, in particular between the first blocking contour and the second blocking contour of the second coupling element, is smaller than the spacing between two adjacent blocking contours of the first coupling element.

In an embodiment, the first engagement arrangement is assigned the first leg of the leg spring and that the second engagement arrangement is assigned the second leg of the leg spring.

In an embodiment a Bowden cable arrangement is provided and wherein an actuation movement may be transmitted via the Bowden cable arrangement for operating the motor vehicle door lock, wherein an adjustment device is provided with a first coupling element and a second coupling element within the chain of operating forces of the cable strand and with a coupling mechanism, which coupling elements may be coupled to each other by the coupling mechanism in different coupling positions relative to each other in order to adjust the length of the cable strand.

In an embodiment, the adjustment device is an integral part of the motor vehicle door lock.

These and other advantages, features and aspects of the invention will be described in more detail in the following detailed description.

BRIEF DESCRIPTION OF THE FIGURES

Aspects of the invention will be described using one or more examples while referring to the following drawings, in which.

DETAILED DESCRIPTION

Figure 1:
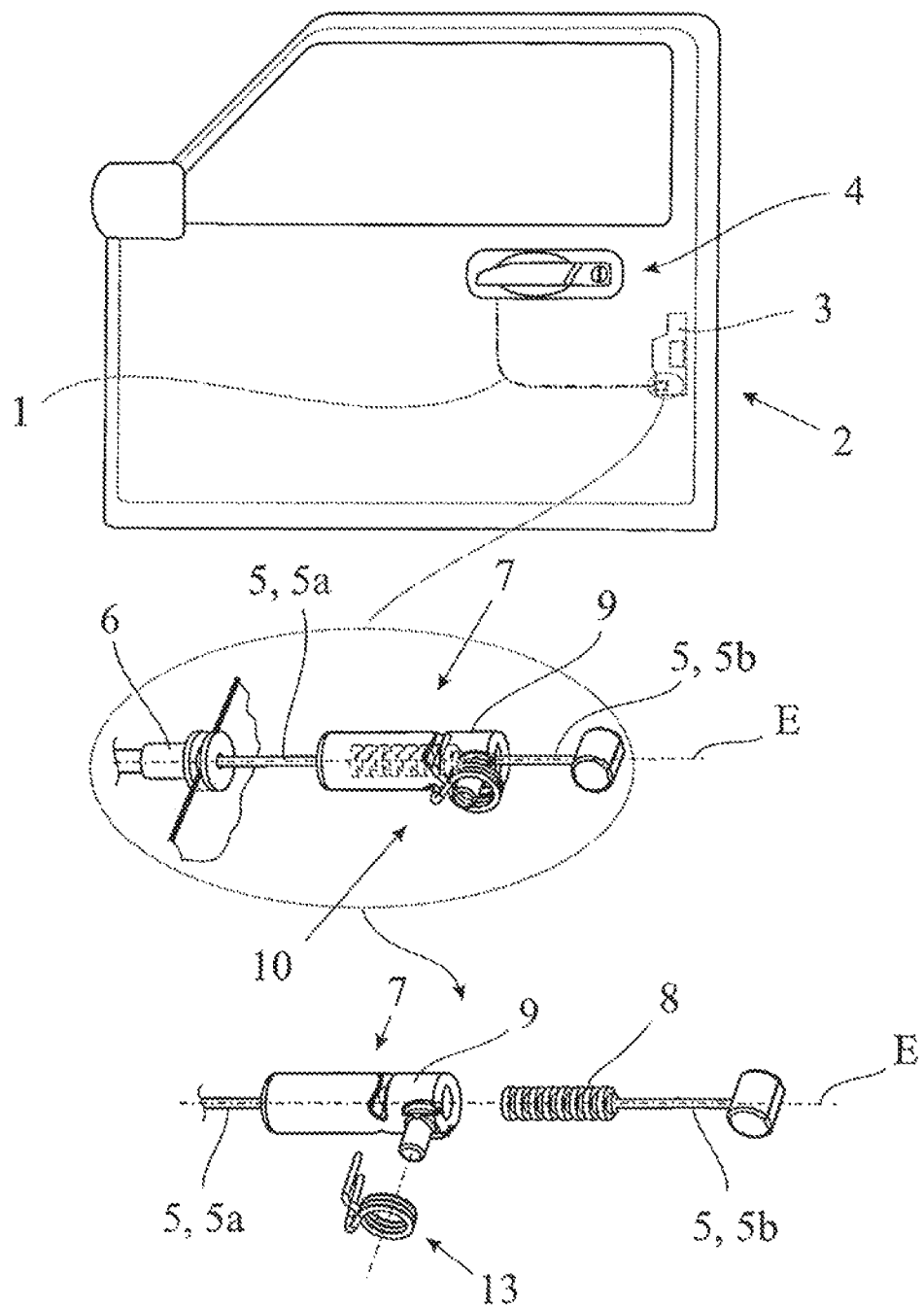
FIG. 1 is a proposed motor vehicle door lock arrangement with a proposed Bowden cable arrangement in schematic representation.

Referring to the figures, one proposed Bowden cable arrangement 1 is assigned to a motor vehicle door lock arrangement 2, which also comprises a motor vehicle door lock 3 as well as a door handle 4, which here is an outer door handle. The Bowden cable arrangement 1 provides a mechanical connection between the door handle 4 and the motor vehicle door lock 3.

The Bowden cable arrangement 1 comprises a cable strand 5 and a cable conduit 6, which corresponds to the known overall structure of a Bowden cable arrangement 1.

As shown in the drawings, the Bowden cable arrangement 1 comprises an adjustment device 7 with a first coupling element 8 and a second coupling element 9, which coupling elements 8, 9 are arranged within the chain of operating forces of the cable strand 5.

Figure 2:
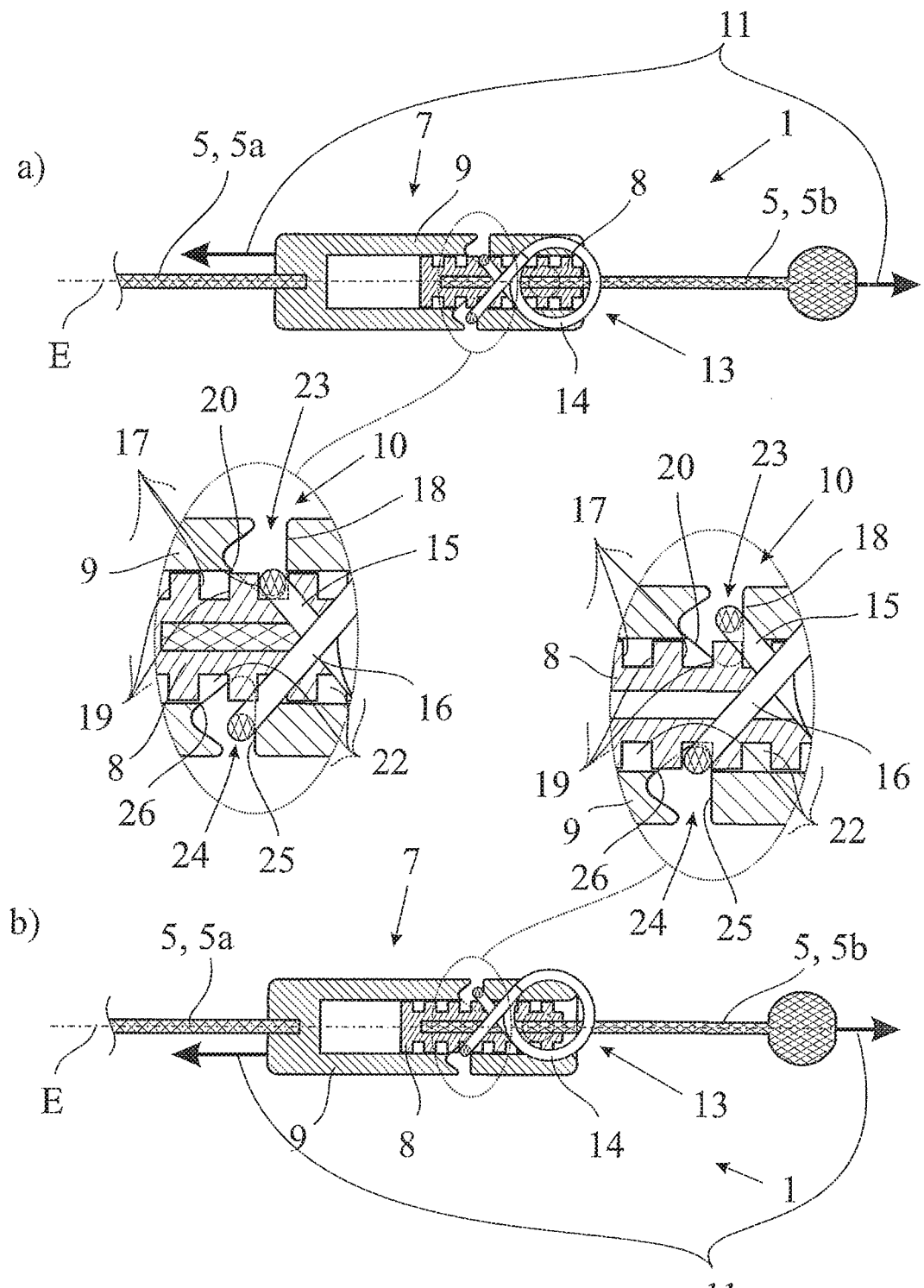
FIG. 2 illustrates the adjustment device of the Bowden cable arrangement in FIG. 1, a) in a first coupling state and b) in a second coupling state.
Figure 3:
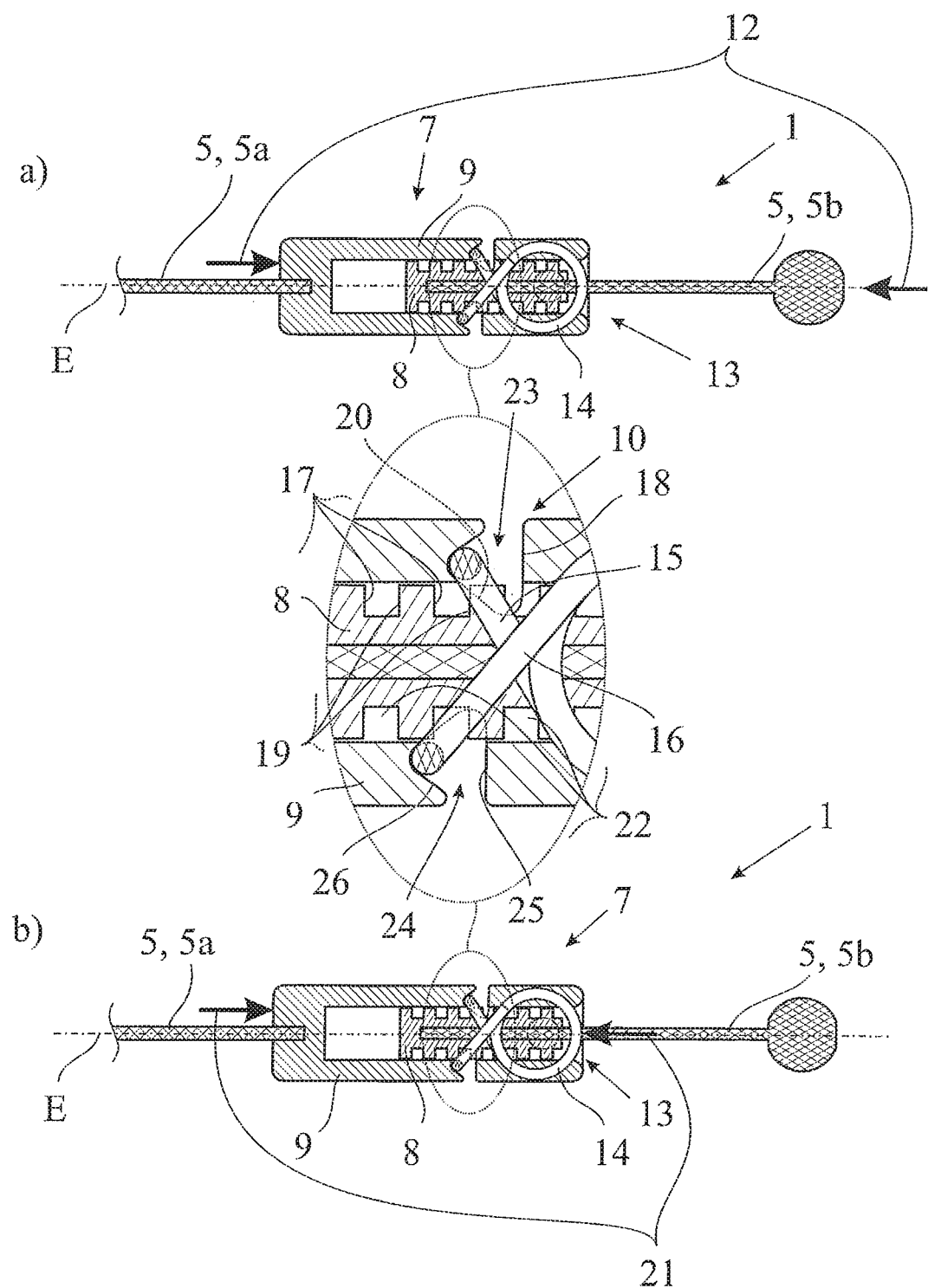
FIG. 3 illustrates the adjustment device according to FIG. 2, a) during an adjustment movement between the coupling elements and b) during a reset actuation of the adjustment device.

In addition, the adjustment device 7 comprises a coupling mechanism 10, wherein the coupling elements 8, 9 may be coupled to each other by the coupling mechanism 10 in different coupling positions relative to each other in order to adjust the length of the cable strand 5. Two different coupling positions are shown in FIG. 2a,b. For this, the coupling elements 8, 9 may be moved against each other along a path of movement E, which in FIGS. 2 and 3 is a horizontal direction.

Here the adjustment device 7 is located between two cable strand sections 5a, 5b, wherein the coupling elements 8, 9 are each connected to a respective cable strand section 5a, 5b. Generally, it may also be possible to design the adjustment device 7 such that it provides one end section of the Bowden cable arrangement 1. Finally it may be advantageous that the adjustment device 7 is an integral part of the motor vehicle door lock 3, as will be explained later.

In general terms, the Bowden cable arrangement 1 shown in the drawings comprises a coupling mechanism 10, which is of the type of a ratchet assembly with respect to the coupling elements 8, 9. For the embodiment shown in FIGS. 2 and 3 this means that the coupling elements 8, 9 may be pushed together, but may not be pulled apart from each other.

In order to realize the above noted ratchet function, the coupling mechanism 10 may be brought into a coupling state, in which it couples the coupling element 8, 9 with each other for the transmission of operating forces. Two variants of the coupling state are shown in FIG. 2 *a, b*. The coupling mechanism 10 may also be brought into a decoupling state, in which it decouples the coupling elements 8, 9 from each other. The coupling state, which has been reached in two different ways, is shown in FIG. 3a, b.

The coupling mechanism 10 couples the coupling elements 8, 9 only in a first direction of force between the coupling elements 8, 9, which first direction of force is indicated with reference number 11 in FIG. 2. In a second direction of force between the coupling elements 8, 9, the coupling mechanism 10 lets the coupling elements 8, 9 run free. The second direction of force is indicated with the reference number 12 in FIG. 2. In further detail, applying a force between the coupling elements 8, 9 in the first direction of force 11 the coupling mechanism 10 enters its coupling state. Accordingly, applying a force between the coupling elements 8, 9 in the second direction of force 12 leads to the coupling mechanism 10 to enter the decoupling state, letting the coupling elements 8, 9 run free against each other.

For realizing a coupling engagement between the coupling elements 8, 9, the coupling mechanism 10 comprises at least one coupling spring 13. In this example, the coupling spring 13 engages the two coupling elements 8, 9 for coupling them in the different coupling positions relative to each other. In order to be able to transmit large forces between the coupling elements 8, 9, the coupling spring 13 can be a wire spring. The material of the coupling spring 13 may be of steel, such as spring steel, or even of plastic. In the last mentioned case the coupling spring 13 may even be a one part component together with one of the coupling elements 8, 9.

Here the coupling spring 13 is designed as a leg spring with a spring body 14, a first leg 15 and a second leg 16. The advantage of applying a leg spring to the coupling mechanism 10, besides providing an extremely compact design, will become apparent later when the function principle of the embodiment shown in the drawings will be explained.

In the coupling state, which is shown in two variants in FIG. 2a, b, the coupling spring 13 is in an engagement position and therewith is in form fit engagement with both coupling elements 8, 9. In the decoupling state, which is shown in FIG. 3, the coupling spring 13 is in a disengagement position and therewith is out of form fit engagement from at least one of the coupling elements 8, 9, here out of form fit engagement from the first coupling element 8.

In order to realize the transmission of operating forces via the adjustment device 7, when driving the two coupling elements 8, 9 into the first direction of force 11, the coupling spring 13 is in engagement with a blocking contour 17 of the first coupling element 8 and a blocking contour 18 of the second coupling element, blocking a relative movement between the coupling elements 8, 9. As may be seen from the drawings, the coupling spring 13, which here is a wire spring, is stressed only in a direction perpendicular to its wire extension, which generally allows high force transmittal without bending or breaking the coupling spring 13.

Comparing the coupling state shown in FIG. 2 and the decoupling state shown in FIG. 3 it becomes apparent that the coupling spring 13 is spring biased into the respective engagement position, such that the coupling spring 13 is urged into a coupling state by its own spring bias. A decoupling state may only be reached against the spring-bias of the coupling spring 13.

Driving the two coupling elements 8, 9 into the second direction of force 12 now leads to the coupling spring 13 being driven by a driving contour 19 of the first coupling element 8 to come into engagement with a throw out contour 20 of the second coupling element 9. The throw out contour 20 forces the coupling spring 13 into the disengagement position, as may best be seen from the representation of FIG. 3a. The same effect may be achieved by a reset actuation on the coupling spring 13, which is shown in FIG. 3b. Such reset actuation on the coupling spring 13 drives the coupling spring 13 to come into engagement with the throw out contour 20 of the second coupling element 9, which throw out contour 20 forces the coupling spring 13 into the disengagement position as noted above. The reset actuation on the coupling spring 13 here is the application of a force onto the spring body 14 along the path of relative movement E between the coupling elements 8, 9, as indicated with reference number 21 in FIG. 3b.

As shown in the drawings, the first coupling element 8 is of oblong design and comprises a plurality of driving contours 19 and a plurality of blocking contours 17. It may also be advantageous to have a plurality of driving contours 19 only or a plurality of blocking contours 17 only arranged at the first coupling element 8. As also may be taken from the drawings, the driving contours 19 and the blocking contours 17 may come into engagement with the coupling spring 13 depending from the coupling position of the coupling elements 8, 9 relative to each other. FIG. 2 shows that the position of the first coupling element 8 relative to the second coupling element 9 may vary resulting in different driving contours 19 respective blocking contours 17 coming into engagement with the coupling spring 13.

In some cases the first coupling element 8 comprises a plurality of ring-like groves 22 along its longitudinal extension, each grove 22 being defined by a blocking contour 17 and a driving contour 19. Further the driving contours 19 and/or the blocking contours 17 is/are aligned perpendicularly to the longitudinal extension of the first coupling element 8, as may be taken from the drawings as well.

An interesting aspect of the embodiment shown in the drawings is the fact that the first coupling element 8 is rotationally symmetric with respect to the path of relative movement E between the coupling elements 8, 9, in particular with respect to its longitudinal extension. As a result, rotating of the first coupling element 8 relative to the second coupling element 9 around the path of relative movement E, in particular around the longitudinal extension of the first coupling element 8, does not lead to any mechanical stress within the Bowden cable arrangement 1 as noted above. This allows a basically force free installation of the Bowden cable arrangement 1, even if some above noted rotational movements are necessary for such installation. As an alternative or in addition, the second coupling element 9 may be rotationally symmetric accordingly.

Up to this point the resolution with respect to the adjustment of the cable strand 5 largely depends on the spacing of the blocking contours 17 of the first coupling element 8 along the path of relative movement E between the coupling elements 8, 9. However, the embodiment shown in the drawings provides a higher resolution with respect to the adjustability. This is because the second coupling element 9 not only comprises a first engagement arrangement 23 with a first, above noted blocking contour 18 and a first above noted throw out contour 20, but also a second engagement arrangement 24 with a second blocking contour 25 and a second throw out contour 26, which engagement arrangements 23, 24 are spaced from each other along the path of relative movement E between the coupling elements 8, 9.

In an embodiment, the spacing between the engagement arrangements 23, 24, in particular between the first blocking contour 18 and the second blocking contour 25 of the second coupling element 9, is smaller than the spacing between two adjacent blocking contours 17 of the first coupling element 8. With this, it is possible to increase the resolution with respect to the proposed adjustment of the cable strand 5, as may be taken from a comparison between FIG. 2*a, b*.

The realization of two or more engagement arrangements 23, 24 is particularly advantageous if the coupling spring 13 is realized as a leg spring as shown in the drawings. In addition, in some implementations the first engagement arrangement 23 is assigned the first leg 15 of the leg spring 13 and that the second engagement arrangement 24 is assigned the second leg 16 of the leg spring 13. This means that the first leg 15 of the leg spring may come into engagement with the blocking contour 18 and the throw out contour 20 of the first engagement arrangement 23 and that the second leg 16 of the leg spring 13 may come into engagement with the blocking contour 25 and the throw out contour 26 of the second engagement arrangement 24, as has been explained before.

It may be pointed out that the proposed solution also includes the application of more than one coupling spring 13, in particular two coupling springs 13, for the coupling mechanism 10. In this case, it may be advantageous two double the arrangement shown in FIG. 2, 3, namely to provide two coupling springs 13, that are each assigned two above noted engagement arrangements 23, 24. With such a structure it is easily possible to further increase the resolution with respect to the adjustment of the cable strand 5.

Another aspect of this disclosure relates to a motor vehicle door lock arrangement 2 as shown in FIG. 1. Such motor vehicle door lock arrangement 2 can include a motor vehicle door lock and a Bowden cable arrangement 1 such as the cable arrangement described above.

Accordingly, an actuation movement may be transmitted via the Bowden cable arrangement 1 for operating the motor vehicle door lock 3. Here the Bowden cable arrangement 1 is arranged between the above noted door handle 4 and the motor vehicle door lock 3. As explained above, an adjustment device 7 is provided with a first coupling element 8 and a second coupling element 9 within the chain of operating forces of the cable strand 5. The adjustment device 7 also comprises a coupling mechanism 10, which couples the coupling element 8, 9 as has been explained above as well.

All explanations given with respect to the proposed Bowden cable arrangement 1 are fully applicable to the motor vehicle door lock arrangement 2.

It has been explained above as well that the adjustment device 7 may be arranged between two cable strand sections 5*a*, 5*b*. However, it may be particularly advantageous that the adjustment device 7 is an integral part of the motor vehicle door lock 3. In particular, a housing of the adjustment device 7 may be provided by a housing of the motor vehicle door lock 3. Other options of the integration of the adjustment device 7 into a motor vehicle door lock 3 are possible.

The invention claimed is:

1. A Bowden cable arrangement for a motor vehicle door lock arrangement, the Bowden cable arrangement comprising a cable strand and a cable conduit, wherein an adjustment device is provided with a first coupling element and a second coupling element within the chain of operating forces of the cable strand and with a coupling mechanism, which coupling elements may be coupled to each other by the coupling mechanism in different coupling positions relative to each other in order to adjust the length of the cable strand;

wherein the coupling mechanism comprises at least one coupling spring, which coupling spring engages the two coupling elements for coupling them in the different coupling positions relative to each other;

wherein the second coupling element comprises at least a first engagement arrangement with a first blocking contour and a first throw out contour and a second engagement arrangement with a second blocking contour and a second throw out contour, which engagement arrangements are spaced from each other along the path of relative movement between the coupling elements; and wherein the at least one coupling spring comprises a leg spring, the first engagement arrangement is assigned a first leg of the leg spring and the second engagement arrangement is assigned a second leg of the leg spring.

2. The Bowden cable arrangement according to claim 1, wherein the coupling mechanism is a ratchet assembly with respect to the coupling elements.

3. The Bowden cable arrangement according to claim 1, wherein the coupling mechanism comprises a coupling state, in which the coupling mechanism couples the coupling elements with each other for the transmission of operating forces, and wherein the coupling mechanism comprises a decoupling state, in which the coupling mechanism decouples the coupling elements from each other.

4. The Bowden cable arrangement according to claim 3, wherein the coupling spring comprises an engagement position, corresponding to the coupling state, in which the coupling spring is in form fit engagement with both coupling elements; and wherein the coupling spring comprises a disengagement position, corresponding to the decoupling state, in which the coupling spring is out of form fit engagement from at least one of the coupling elements.

5. The Bowden cable arrangement according to claim 1, wherein the coupling mechanism couples the coupling elements only in a first direction of force between the coupling elements and lets the coupling elements run free in a second direction of force between the coupling elements.

6. The Bowden cable arrangement according to claim 1, wherein the coupling spring engages with a blocking contour of the first coupling element and at least one of the first and second blocking contours of the second coupling element in response to the first and second coupling elements being driven in a first direction of force, and wherein the engagement between the coupling spring and the blocking contours blocks a relative movement between the coupling elements.

7. The Bowden cable arrangement according to claim 1, wherein the first coupling element comprises a driving contour, and wherein, in response to the first and second coupling elements being driven in a second direction of force, the driving contour drives the coupling spring into engagement with at least one of the first and second throw out contours of the second coupling element and wherein the at least one of the first and second throw out contours forces the coupling spring into the disengagement position.

8. The Bowden cable arrangement according to claim 7, wherein the coupling spring is driven into engagement with the throw out contour and the throw out contour forces the coupling spring into the disengagement position in response to a reset actuation on the coupling spring.

9. The Bowden cable arrangement according claim 1, wherein the first coupling element is of oblong design and comprises a plurality of driving contours and/or of blocking contours, which may come into engagement with the coupling spring depending from the coupling position of the coupling elements relative to each other.

10. The Bowden cable arrangement according claim 9, wherein the first coupling element comprises a plurality of ring like grooves along its longitudinal extension, each groove being defined by a blocking contour and a driving contour, and wherein the driving contours and/or the blocking contours is/are aligned perpendicularly to the longitudinal extension of the first coupling element.

11. The Bowden cable arrangement according to claim 1, wherein the first coupling element and/or the second coupling element is/are rotationally symmetric with respect to the path of relative movement between the coupling elements.

12. The Bowden cable arrangement according to claim 1, wherein the spacing between the engagement arrangements is smaller than the spacing between two adjacent blocking contours of the first coupling element.

13. The Bowden cable arrangement according to claim 1, wherein the coupling spring comprises a wire spring.

14. The Bowden cable arrangement according to claim 1, wherein the spacing between the first blocking contour and the second blocking contour of the second coupling element is smaller than the spacing between two adjacent blocking contours of the first coupling element.

15. A motor vehicle door lock arrangement with a motor vehicle door lock, wherein a Bowden cable arrangement is provided and wherein an actuation movement may be transmitted via the Bowden cable arrangement for operating the motor vehicle door lock, wherein an adjustment device is provided with a first coupling element and a second coupling element within the chain of operating forces of the cable strand and with a coupling mechanism, which coupling elements may be coupled to each other by the coupling mechanism in different coupling positions relative to each other in order to adjust the length of the cable strand;

wherein the coupling mechanism comprises at least one coupling spring, which coupling spring engages the two coupling elements for coupling them in the different coupling positions relative to each other;

wherein the second coupling element comprises at least a first engagement arrangement with a first blocking contour and a first throw out contour and a second engagement arrangement with a second blocking contour and a second throw out contour, which engagement arrangements are spaced from each other along the path of relative movement between the coupling elements; and wherein the at least one coupling spring comprises a leg spring, the first engagement arrangement is assigned a first leg of the leg spring and the second engagement arrangement is assigned a second leg of the leg spring.

16. The motor vehicle door lock arrangement according to claim 15, wherein the adjustment device is an integral part of the motor vehicle door lock.

* * * * *